G. W. MORTHLAND.
GAS ENGINE STARTER.
APPLICATION FILED OCT. 4, 1915.
1,201,852.
Patented Oct. 17, 1916.
2 SHEETS—SHEET 2.
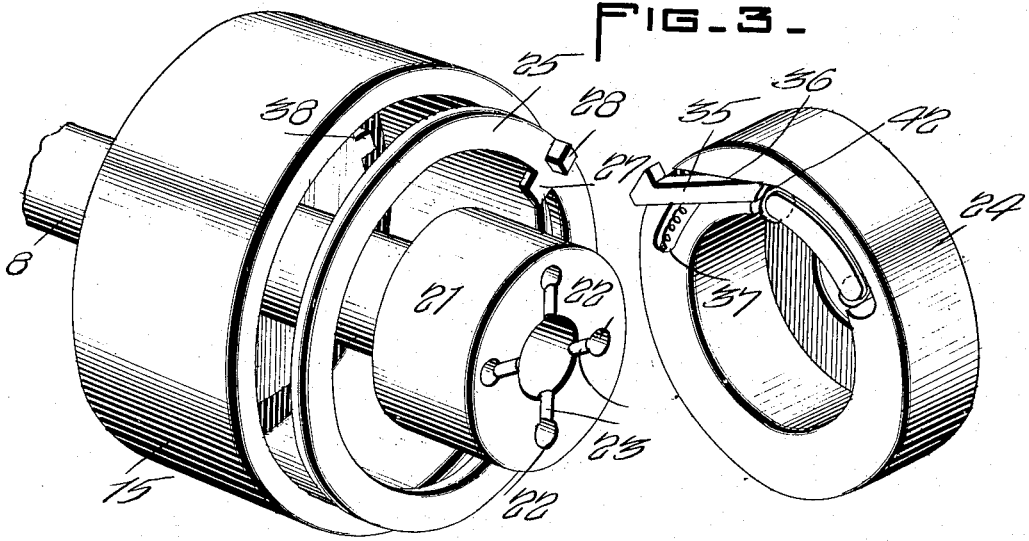
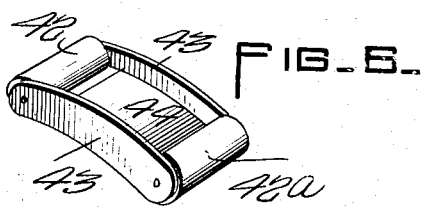
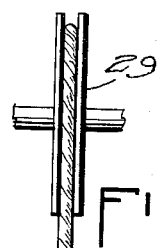
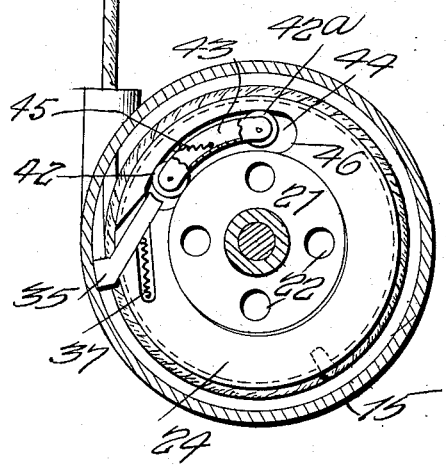
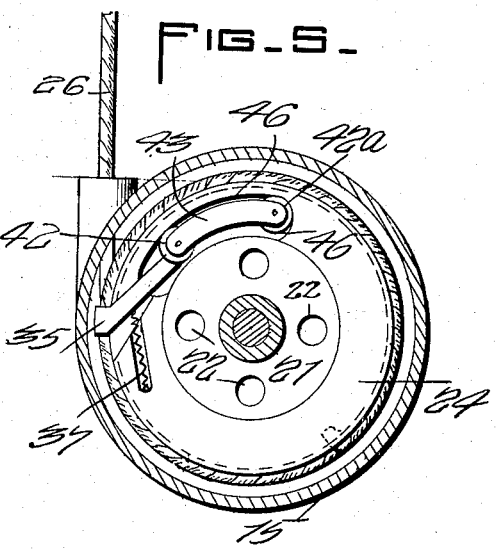
WITNESSES:
INVENTOR
George W. Morthland,
BY Munn & Co.
ATTORNEYS

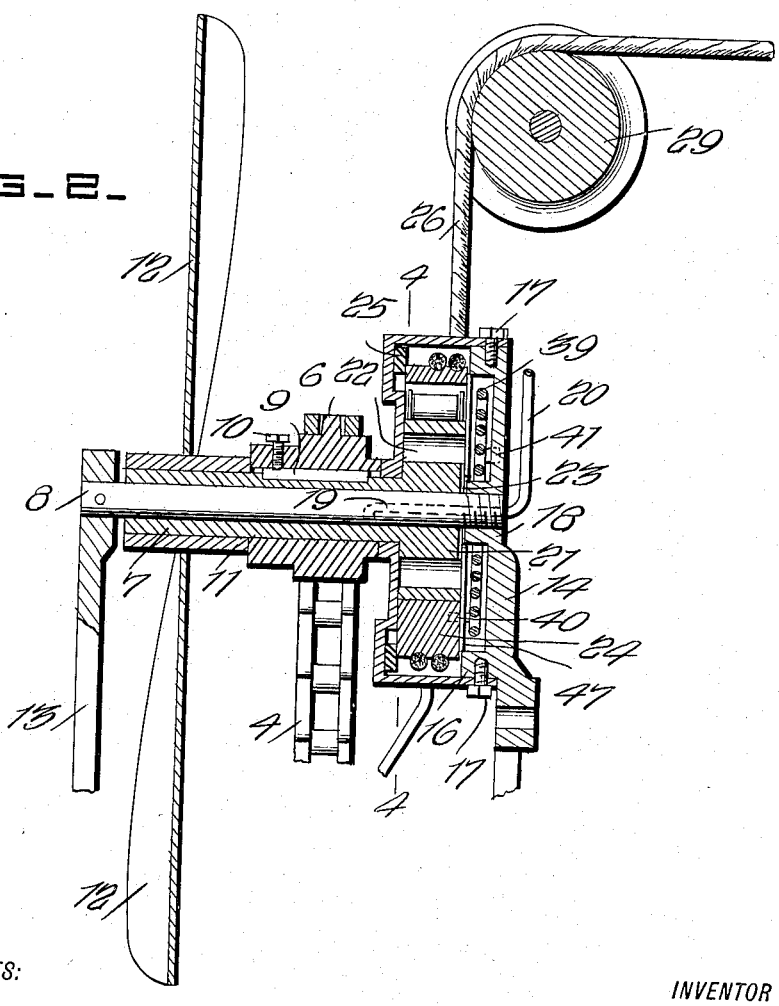

UNITED STATES PATENT OFFICE.

GEORGE W. MORTHLAND, OF LEAD, SOUTH DAKOTA.

GAS-ENGINE STARTER.

1,201,852. Specification of Letters Patent. Patented Oct. 17, 1916.

Application filed October 4, 1915. Serial No. 54,000.

*To all whom it may concern:*

Be it known that I, GEORGE W. MORTHLAND, a citizen of the United States, and a resident of Lead, in the county of Lawrence and State of South Dakota, have invented a new and useful Improvement in Gas-Engine Starters, of which the following is a specification.

My invention is an improvement in gas engine starters, and consists in certain novel constructions and combinations of parts that will be hereinafter described and claimed.

In the drawings: Figure 1 is a side view of the improved starter in place on an automobile, Fig. 2 is an enlarged longitudinal section of the starter, Fig. 3 is a perspective view of the clutch connection, Fig. 4 is an end view of the same with the parts in one position, Fig. 5 is a similar view with the parts in another position, and Fig. 6 is a perspective view of the roller device.

The present embodiment of the invention is shown in connection with the engine 1 of an automobile 2, and the device is connected with the crank shaft 3 of the engine by means of a sprocket chain 4. This chain 4 engages at one end a sprocket wheel 5 on the crank shaft and at the other a sprocket wheel 6, mounted on a sleeve 7, which is arranged on the starting shaft 8.

The wheel 6 is keyed to the sleeve by a key 9, and a set screw 10 is threaded through the hub of the sprocket wheel into engagement with the key in the registering guideways. The hub 11 of a fan 12 is mounted on the outer end of the sleeve, and the shaft 8 is supported in a bearing bracket 13 at its outer end secured to a suitably fixed portion of the automobile, and at its inner end by a bracket 14, which is supported by the crank case of the engine.

A casing is mounted on the inner end of the sleeve 7, the said casing consisting of a substantially cylindrical case 15, and a portion of the bracket 14. This bracket has a laterally extending circular flange 16, which fits within the rim of the case 15, and the rim is secured to the flange or rib 16, by means of screws 17.

The shaft 8 is rigidly secured to the casing, being threaded into a hub 18 at the center of the flange or rib 16 at its inner end, and the shaft is bored axially as indicated at 19 at its inner end for a portion of its length, and a pipe 20 is engaged with the inner end of the bore. This bore has a lateral extension which delivers oil passing through the pipe 20 from a suitable receptacle to the bearing surface between the sleeve 7 and the shaft 8.

The sleeve 7 has an annular enlargement or disk 21 within the case 15, and this enlargement 21 is provided with a series of parallel openings extending parallel with the shaft 8. These openings 22 are connected by grooves 23 to the inner end of the bore of the sleeve 7, and in practice the openings 22 are filled with a suitable lubricant for lubricating the ends of the disk 21. A ring 24 is mounted on the disk, and a ring 25 is mounted in the casing at the end adjacent to the fan, the said ring engaging the adjacent face of the ring 24, as shown in Fig. 2.

The case 15 has an annular offset or enlargement at the ring, and a flexible member 26 as for instance, a rope or cord, winds upon the periphery of the ring or drum 24. The ring 25 has an inwardly extending radial lug 27, and a lateral lug 28 at the lug 27. The flexible member passes from the drum out through the case and over a pulley 29, journaled at a suitable point in the hood of the automobile to a connection with a stirrup 30, which is journaled at its opposite end on the axis of a pulley 31.

A flexible member 32 passes over the pulley and passes inwardly through openings in the foot board 33 of the automobile, and a handle 34 is connected to one end of the flexible member. This flexible member is preferably flat, and it will be evident that when the said flexible member is drawn inwardly the pulley 31 will be drawn inwardly and the flexible member 26 will be unwound from the drum. The ring or drum 24 will be rotated, and clutch mechanism is provided between the drum and the disk 21 for constraining the sleeve to rotate with the drum. This clutch mechanism as shown in Fig. 3 comprises a trip arm 35, which is mounted on the drum 24, and is adapted to engage the lug 28 of the ring 25. The trip arm is mounted in a recess 36 in the adjacent face of the drum 24, and a coil spring 37 normally presses the free end of the trip inward. Whenever the trip arm 35 engages the lug 28 it will be obvious that the ring 25 will rotate with the drum 24 and this will continue until the lug 27 comes into engagement with a lug 38. The lug 38 is a part of the case 15, and the drum will make a complete rotation before the trip arm engages the lug 28. The drum and the ring 25 will then make another complete rotation until the lug 27 engages the lug 38. This is the full scope of travel of the drum and of the ring 25. The drum should be grooved peripherally to properly guide the flexible member 26.

When tension is applied to the flexible member toward the driver, the drum 24 will be rotated to tighten or wind up a spring 39, which is arranged within the rib 16, having one end secured to the drum as indicated at 40, and the other end to the bracket 14 as indicated at 41. At the same time the trip member 35 will be carried back by the contraction of the spring 37, and will draw the trip arm away from the grip roller 42. This roller is journaled in the ends of a pair of arc-shaped plates 43, and another roller 42ª is journaled at the opposite ends of the plates. The plates are connected by an arc-shaped plate 44 on their under side, and a coil spring 45 is arranged between the plate 44 and the drum 24, and this spring normally acts to draw the roller 42 outward. The rollers 42—42ª and the plates 43 and 44 are arranged within a recess 46 in the drum, and the rollers contact with the periphery of the disk 21 and with the outer wall of the interior of the recess 46. The recess 46 before mentioned, decreases in width at the end adjacent to the trip arm 35, and the spring 45 normally draws the element 42—43—44 in a direction to clutch the disk 21 to the drum 24.

The initial position of the arm 35 and the rollers 42 and 42ª is as shown in Fig. 5, and it will be noticed that the rollers are free from the disk 21, and there is no contact between the disk and the roller 42. Hence, the disk 21 is free to rotate in either direction. When power is applied to the cable 26, the upper part of the drum 34 will move to the right of Figs. 4 and 5, that is, in the direction the engine shaft turns. At the same time the arm 35 and the roller 42 will by the contraction of springs 37 and 45 move to the left until the roller 42 engages with the disk 21, as indicated in Fig. 4. The disk 21 is now locked to the drum 24 and will rotate therewith during two complete revolutions of the drum. When the cable 26 is released, the drum 24 will return to its original position, as shown in Fig. 5, rotating with the upper part thereof moving toward the left of the drawing. When in the initial position, the arm rests against the lug 28, and the lug 27 rests against the lug 38. The recoil of the main spring 39 will hold the arm 35 and the roller 42 in the initial position of Fig. 5. There is no stress resisting the reverse motion of the disk 21 when the cable 26 is slack or relaxed.

The spring 39 returns the parts to normal position after the engine has been started. The fan is not a necessary element of the combination, being merely a cooling fan. In Fig. 1 is shown two methods of starting the engine: first by applying power to the flexible member 32, grasping both ends of the said member, one full turn of the engine shaft may be obtained by exerting a given force with the given length of travel; second by applying power at the element 34 only, the engine shaft will be given a half turn and the force required will be but one half of the force required in the former case, it being assumed that the travel of the element 34 and the travel of the element 34ª are the same in both cases. The grooves 23 are channels through which the oil supplied by the pipe 20 and the opening 19 may flow.

When cable 26 is released, drum 24 moves toward the left as before described, until arm 35 abuts the lug 28, completing the first reverse revolution independent of ring 25, and as soon as arm 35 abuts lug 28, the ring 25 is forced around with the drum in its second reverse revolution until the lug 27 again abuts the opposite side of lug 38 as compared to that side which it engages to limit rotation of the drum when cable 6 is unwinding. The parts are then in normal position ready for the next operation.

I claim:

1. An engine starter, comprising in combination with the engine shaft, of a fixed shaft journaled parallel therewith, a starting sleeve journaled on the fixed shaft and having a driving connection with the engine shaft for constraining the said engine shaft to rotate with the starting sleeve, said sleeve having a disk at its inner end, a casing inclosing the disk, a drum journaled on the disk, a flexible member winding on the drum for rotating the drum in one direction, a spring for returning the drum, releasable clutch mechanism between the drum and the disk for constraining the disk to rotate with the drum when the flexible member is unwound, means for limiting the forward movement of the drum to two complete rotations, and means operated by a reverse movement of the starting sleeve for releasing the drum from the sleeve, said first-named means comprising a ring journaled in the case adjacent to the drum, the drum having a trip arm and the ring having a lateral lug for engagement by the arm to constrain the ring to rotate with the drum when the drum has made a complete rotation, the ring and the case having interengaging lugs for stopping the further movement of the drum and ring when the ring has completed a complete rotation, said last-named means comprising an engagement between the trip arm and the clutch mechanism for releasing the clutch mechanism when the trip arm is moved inwardly.

2. An engine starter, comprising in combination with the engine shaft, of a fixed shaft journaled parallel therewith, a starting sleeve journaled on the fixed shaft and having a driving connection with the engine shaft for constraining the said engine shaft to rotate with the starting sleeve, said sleeve having a disk at its inner end, a casing inclosing the disk, a drum journaled on the disk, a flexible member winding on the drum for rotating the drum in one direction, a spring for returning the drum, releasable clutch mechanism between the drum and the disk for constraining the disk to rotate with the drum when the flexible member is unwound, means for limiting the forward movement of the drum to two complete rotations, and means operated by a reverse movement of the starting sleeve for releasing the drum from the sleeve, said first-named means comprising a ring journaled in the case adjacent to the drum, the drum having a trip arm and the ring having a lateral lug for engagement by the arm to constrain the ring to rotate with the drum when the drum has made a complete rotation, the ring and the case having interengaging lugs for stopping the further movement of the drum and ring when the ring has completed a complete rotation.

3. An engine starter, comprising in combination with the engine shaft, of a fixed shaft journaled parallel therewith, a starting sleeve journaled on the fixed shaft and having a driving connection with the engine shaft for constraining the said engine shaft to rotate with the starting sleeve, said sleeve having a disk at its inner end, a casing inclosing the disk, a drum journaled on the disk, a flexible member winding on the drum for rotating the drum in one direction, a spring for returning the drum, releasable clutch mechanism between the drum and the disk for constraining the disk to rotate with the drum when the flexible member is unwound, means for limiting the forward movement of the drum to two complete rotations, and means operated by a reverse movement of the starting sleeve for releasing the drum from the sleeve.

4. The combination with an engine shaft, of a starting member connected to the engine shaft and having a disk fixed thereon, a drum rotatable on the disk, a fixed casing around the drum and disk, a starting cable connected to the drum and extending outwardly through the casing, automatically operating clutch means for engaging said drum and disk when the former is rotated in one direction by the said cable, means acting in connection with the drum and said fixed casing for limiting rotative movement of the drum under actuation of said cable, and means for returning the parts to normal position when the cable is released after each operation.

5. The combination with an engine shaft, of a starting member connected to the engine shaft and having a disk fixed thereon, a drum rotatable on the disk, a fixed casing around the drum and disk, a starting cable connected to the drum and extending outwardly through the casing, said drum having a recess in its inner periphery smaller at one end than the other, a rolling clutch member disposed in said recess adjacent the periphery of the disk and movable to clutch the drum with the disk when the former is rotated in one direction by the cable, means acting in connection with the drum and said fixed casing for limiting rotative movement of the drum under actuation of said cable, and means for returning the parts to normal position when the cable is released after each operation.

6. The combination with an engine shaft, of a starting member connected to the said engine shaft and having a disk fixed thereon, a drum rotatable on the disk, a fixed casing around the drum and disk, having a lug at one side thereof, a ring movable between the drum and the said casing side and having a lug engageable with the casing lug to limit rotative movement thereof, an arm carried by the drum, a second lug carried by said ring and with which said arm is engageable to limit rotative movement of the drum when the first lug of the ring is in engagement with the casing lug, automatically operating clutch means for engaging said drum and disk when the former is rotated in one direction, a starting cable connected to the drum and extending outwardly through the casing, and means for returning the parts to normal position when the cable is released after each operation.

GEORGE W. MORTHLAND.

Witnesses:
N. D. POOL,
W. J. HARVEY.